United States Patent [19]
Aldous

[11] 3,839,790
[45] Oct. 8, 1974

[54] INSULATION STRIPPING DEVICE

[75] Inventor: Harold William Aldous, Fort Lauderdale, Fla.

[73] Assignee: Systems Engineering Laboratories, Fort Lauderdale, Fla.

[22] Filed: June 6, 1972

[21] Appl. No.: 260,258

[52] U.S. Cl. .............................................. 30/90.1
[51] Int. Cl. .......................... H02g 1/12, B26b 27/00
[58] Field of Search ......... 29/203 DT; 30/90.1, 181, 30/237, 238, 357; 81/9.5 R, 9.5 A, 9.5 B, 9.5 C, 9.51; 140/124, 149

[56] References Cited
UNITED STATES PATENTS

| | | | |
|---|---|---|---|
| 1,877,376 | 9/1932 | Wright et al. | 30/181 |
| 1,993,546 | 3/1935 | Hart et al. | 30/181 |
| 2,722,145 | 11/1955 | Schulenburg | 81/9.51 |
| 3,003,375 | 10/1961 | Hopkins | 81/9.51 |
| 3,309,948 | 3/1967 | Falken | 81/9.51 |
| 3,427,717 | 2/1969 | Neale | 30/181 |

FOREIGN PATENTS OR APPLICATIONS

| | | | |
|---|---|---|---|
| 660,891 | 11/1951 | Great Britain | 30/357 |

OTHER PUBLICATIONS

Insulation Stripper for Twisted Wires, F. H. Curley, IBM Technical Disclosure Bulletin, October 1960.

Primary Examiner—Charles W. Lanham
Assistant Examiner—E. M. Combs
Attorney, Agent, or Firm—Fleit, Gipple & Jacobson

[57] ABSTRACT

Two cooperating blades are adapted to move together and apart and each blade is provided with a cutting surface position at an angle of about 10° with respect to the direction of longitudinal movement. Movement of the cooperating blades together causes the end of a pair of twisted insulated wires placed therebetween to rotate until both wires are evenly placed between the cutting surfaces. This rotary movement causes the insulation of each wire to be cleanly and evenly cut so that the body of the wire can be simply withdrawn from the jaws of the device to strip the unwanted insulation from the wire ends.

6 Claims, 6 Drawing Figures

INSULATION STRIPPING DEVICE

BACKGROUND OF THE INVENTION

The present invention relates to a method and apparatus for the removal of wire insulation from a twisted pair of insulated wires.

Many electrical connections are made by pairs of insulated wires in which each wire is spirally wound or twisted around the other. Such wire pairs are often prewound, and it is therefore common when employing such a wire pair to cut a proper length from the supply spool and then manually remove the insulation from the wire ends. Traditionally, this had been accomplished by untwisting a few inches of the twisted wire pair on each end, manually removing the insulation on each of the four ends thus produced, and thereafter retwisting the naked metal conductor wires if desired.

Because these methods require a number of involved manual steps, mechanisms have been produced for mechanical removal of the insulation. One such device is disclosed in U.S. Pat. No. 3,003,375 to Hopkins, which discloses a simplified insulation stripping mechanism containing a pair of swinging knife blades pivotally secured to a support and adapted to rotate so that their sharpened blades swing together. In operation, the end of a twisted wire pair is placed in an appropriate position and the blades swung together. Because of the construction and movemenet of the blades, a rolling action is imparted to the end of the twisted wire pair so that the cutting edges of the swinging blades sever a major portion of the insulation.

While this device considerably simplifies insulation stripping, it is not particularly useful for many applications. Because of the comparatively complicated configuration and movement of the blades, the device is necessarily large in size. As a consequence, it can conveniently be used only as a bench fixture and not as a simple hand tool for use in removed locations. Moreover, because of the complicated nature of the pivotal action of the blades, manufacturing costs of the device are high.

Accordingly, it is an object of this invention to provide a method and apparatus for the removal of the wire insulation from the ends of a twisted pair of insulated wires which is of simple construction and capable of being employed in a simple hand tool.

It is still another object of this invention to provide an apparatus for stripping the insulation from a pair of twisted insulated wires which is of very simple construction and accordingly easy to manufacture.

SUMMARY OF THE INVENTION

These and other objects are accomplished according to the present invention wherein a pair of cooperating cutting blades are spaced apart and adapted to move towards one another and apart. The blades are constructed so that the cutting edge of each blade is located at an angle of about 10° with respect to the direction of movement of the blades, and a twisted pair of insulated wires is placed between the blades so that each wire faces only one cutting edge.

In operation, the blades are moved towards one another, and as a result, each cutting edge engages the insulation of the wire it faces. Further movement of the blades together causes the twisted pair of wires to roll about their point of mutual contact until each cutting surface engages both wires. As a result, a substantial portion of the insulation on both wires is cleanly severed. The body twisted pair of insulated wires can then be simply withdrawn from between the pair of closed blades to strip the insulation from the ends of the wires.

BRIEF DESCRIPTION OF THE DRAWINGS

The nature of the present invention may be better understood by reference to the following drawings wherein.

DETAILED DESCRIPTION

Figure 1:
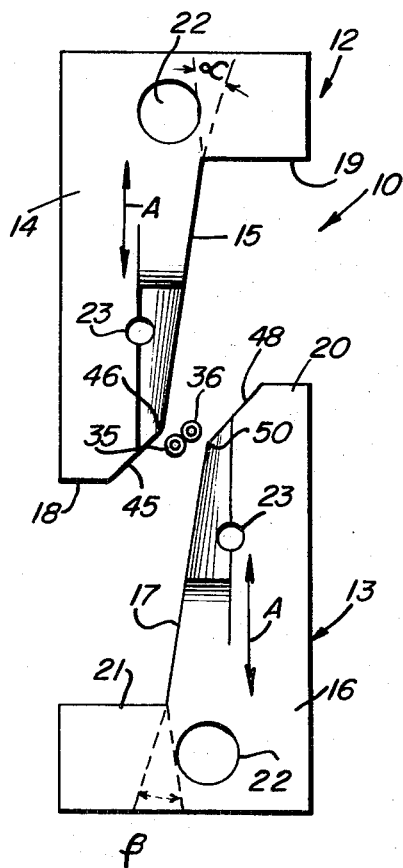
FIG. 1 is a side view of the inventive blade system showing the positioning of the blades with respect to one another and the positioning of the cutting edge of each blade.

The inventive blade system, generally indicated at 10 in FIG. 1, is composed of two identical blades 12 and 13. Blade 12 is composed of a blade body 14 and a cutting edge 15, while blade 13 is composed of a blade body 16 and a cutting edge 17. In addition, blade 12 is provided with leading edge 18 and a bevel edge 45 which forms apex 46 with cutting edge 15. Likewise, blade 13 is provided with leading edge 20, an abutting edge 21 and a bevel edge 48 which forms apex 50 with cutting edge 17. Moreover, each blade is provided with a set of securing holes 22 and 23 so that each blade can be secured in one of a pair of opposing reciprocating blocks (not shown) adapted to move the blades longitudinally together and apart in the direction of arrows A.

Figure 2:
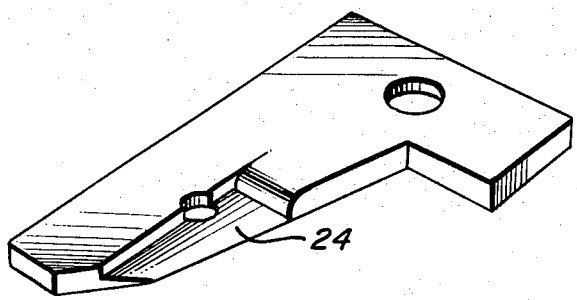
FIG. 2 is an isometric view of one of the blades of the inventive blade assembly.
Figure 6:
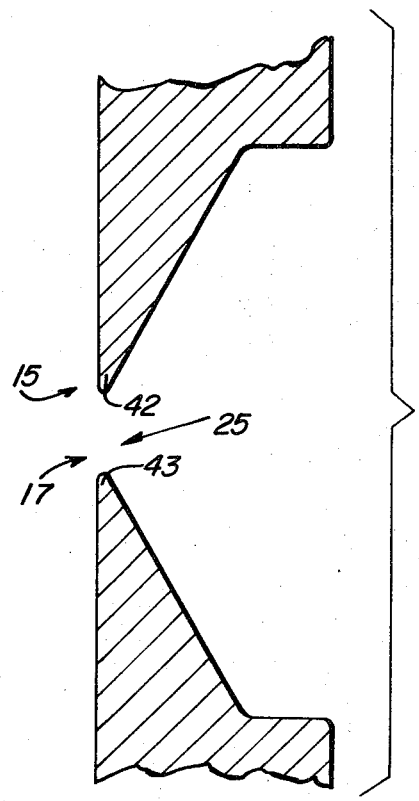
FIG. 6 is a planar cross-section showing the cutting edges of the inventive blades.

As can best be seen from FIG. 2, the cutting edge of each blade is formed by the underface of the blade (as shown in FIG. 2) and sloping surface 24. Accordingly, as shown in FIG. 6, when moved together, the blades form an indentation, generally indicated at 25, in which the insulation being stripped is located.

Referring again to FIG. 1, cutting edge 15 of blade 12 defines a cutting angle alpha with the direction of movement of the blades, while cutting edge 17 of blade 13 likewise defines a cutting angle beta with the direction of movement of the blades. Surprisingly it has been found that both angle alpha and angle beta must be maintained relatively close to 10° if the advantageous cutting action provided the inventive blade assembly is to be maintained. If angles alpha and beta are varied significantly from the value, a single closing of the blades will not sever sufficient insulation and a second closing of the blade will be required for easy insulation stripping.

Figure 4:
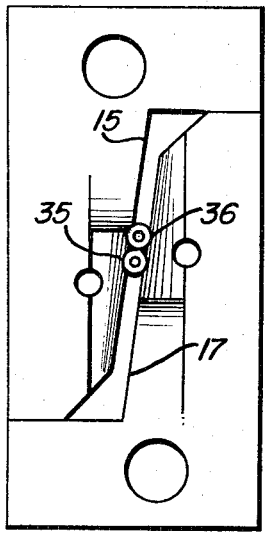
FIGS. 3–4 are schematic representations showing the operation of the blades of the inventive apparatus.
Figure 3:
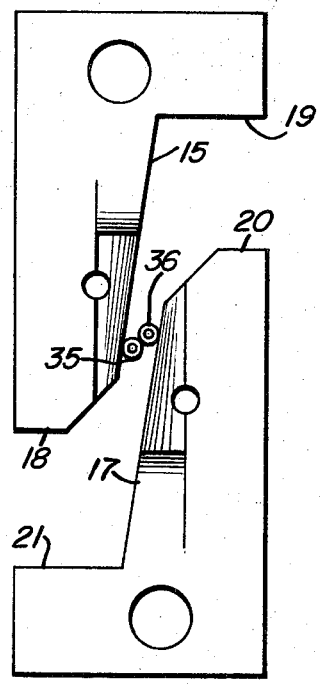

The operation of the inventive apparatus can be readily understood by reference to FIGS. 1, 3 and 4. As shown in FIG. 1, blades 12 and 13 are positioned in an open position so that cutting edges 15 and 17 are separated apart. A pair of twisted insulated wires composed of a first wire 35 and the second wire 36 is then positioned between the blades, which as shown in FIG. 3, are then caused to move together so that cutting edges 15 and 17 are closer together. During this movement, apex 46 of blade 12 abuts wire 35 and apex 50 of blade 13 abuts wire 36 and as a consequence, a counterclockwise twisting motion is imparted to the wire pair. The wire pair is thereby twisted until it can fit between cutting edges 15 and 17 which have now moved closer together than the thickness of the two wires together.

As shown in FIG. 4, blades 12 and 13 are brought still further together so that at tne end of the cutting cycle, leading edge 18 of blade 12 abuts abutting edge 21 of blade 13 and leading edge 20 of blade 13 abuts abutting edge 19 of blade 12. At this time, cutting edges 15 and 17 are separated by a distance, which as shown in the figure, is slightly larger than the diameter of the internal metal wire of the insulated wires 35 and 36. Because the abutting edges are spaced apart by this distance at the end of the cutting cycle, substantially no nicking or cutting of the metal wires occurs when the metal wires are withdrawn as the insulation is stripped.

Figure 5:
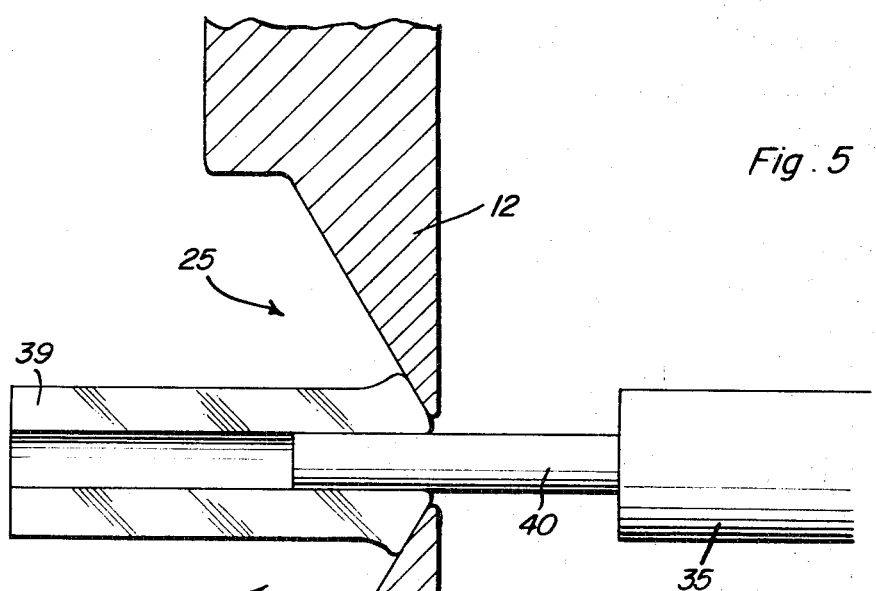
FIG. 5 is a cross-sectional side view of the blade system employed in the inventive apparatus showing the actual stripping of insulation in the inventive process.

As can be seen from a comparison of FIGS. 1, 3 and 4 once between the cutting edges 15 and 17, the insulated wires 35 and 36 are caused to further rotably move in a counterclockwise direction, that is from the position shown in FIG. 3 to the position shown in FIG. 4. This movement enables cutting edge 15 of blade 12 to make a neat and clean cut in a major portion of the insulation covering insulated wire 35 and also enables cutting edge 17 to make a neat and clean cut in a major portion of the insulation covering insulated wire 36. Moreover, as the blades come together to the position shown in FIG. 4, cutting edge 15 of blade 12 engages and cuts a still further portion of the insulation covering wire 36, while cutting edge 17 of blade 13 engages and cuts a still further portion of the insulation covering wire 35. Because of these cuts, the insulation covering both wires can be easily removed by simply pulling the body of the twisted pair of wires out from the back of the blades. This operation is more fully shown in FIG. 5 which illustrates wire 35 being withdrawn to the right from closed blades 12 and 13 so that severed insulation piece 39 is withdrawn off of metal conductor wire 40.

In order to provide the proper movement to blades 12 and 13, the blades can be simply mounted in a pair of opposing reciprocating blocks or other suitable mounting means. Many mounting systems for moving a pair of opposing cutting blades together and apart are well known in the art, and any such system can be employed in the present invention.

The inventive blade system is capable of providing substantially nick-free stripping of the wire insulation on the ends of a twisted pair of insulated wires. In this regard, the contour of cutting edge 15 and cutting edge 17 can play an important role in preventing nicks from forming on wire surfaces 40 as it is withdrawn from between the blades 12 and 13. In order to prevent any nicks from forming, cutting edges 15 and 17 are preferably made slightly rounded in configuration. This construction is more fully shown in FIG. 6 which shows cutting edge 15 being formed from a rounded surface 42 and cutting surface 17 being formed by rounded surface 43.

Cutting surfaces of this configuration are preferable because if the cutting surfaces are too sharp, nicking of the metal wires as they are withdrawn from between the blades becomes more pronounced. By reducing the sharpness of the cutting edges, nicking can be substantially reduced. However, as is evident, the cutting surfaces 15 and 17 cannot be made too dull or else the blades will not properly sever the insulation on the pair of twisted insulated wires 35 and 36. Accordingly, when designing the blades for stripping the insulation from a particular pair of twisted insulated wires, the exact curvature of curved surfaces 42 and 43 must be selected to maximize insulation cutting without introducing undue nicking to the metal wire.

The foregoing description has been presented for illustrative purposes only and is not intended to limit the invention in any way. All reasonable modifications of the invention not specifically set forth are intended to be included within the scope of the invention, which is to be only limited by the following claims.

I claim:

1. Apparatus for stripping the insulation from the ends of a pair of randomly oriented twisted insulated wires each having a wire core and an insulation sheath surrounding said wire core, said apparatus comprising:

a pair of cooperating blades adapted to linearly reciprocate together, without rotation, to engage said pair of randomly oriented twisted insulated wires, and to linearly move apart, said blades composed of a first blade and a second blade, said blades having opposed cutting edges each forming a cutting angle of about 10° with its direction of linear reciprocation, said first blade and said second blade positioned so that the cutting edge of said first blade is substantially parallel to the cutting edge of said second blade;

means to linearly reciprocally move said first blade and said second blade together and apart in such a manner that the cutting edges of said first and second blades remain parallel, and such that the respective cutting edges move closer together when said cooperating blades are reciprocated together, and wherein the cutting edges of the blades upon first engaging the randomly oriented twisted pair of wires reorient the twisted wire pair until the line drawn between the center of the wires in the plane of said cutting edges is substantially parallel to said cutting edges; and stop means associated with said blades for preventing the cutting edges of the blades from moving closer together than the diameter of said wire cores such that the cutting edges of the blades sever sufficient of the insulation sheaths on each wire when moved together to enable the insulating sheaths on the ends of the wires to be stripped by simply pulling the wire pair from between the blades when together.

2. Apparatus according to claim 1 further including positioning means for positioning a pair of twisted wires between the cutting edges of said first and second blades.

3. Apparatus according to claim 2, wherein said first blade has a front surface and a back surface and wherein said cutting edge of the first blade extends from the front surface of said first blade, and further wherein said second blade has a front surface and a back surface and wherein the cutting edge of said second blade extends from the front surface of said second blade; said apparatus further characterized in that the front surface of said first blade and the front surface of said second blade are substantially coplanar.

4. Apparatus according to claim 3, wherein said cutting edges are rounded in configuration.

5. A process for removing the insulation from the ends of a pair of randomly oriented twisted insulated wires each having a wire core and an insulation sheath surrounding said wire core, said process comprising:

positioning a length of the randomly oriented twisted pair of insulated wires between the cutting edges of a pair of cooperating mutually linearly reciprocating blades, said cutting edges being substantially parallel and each cutting edge defining an angle of about 10° with its direction of linear reciprocation;

moving the pair of cooperating blades together in such a manner that the cutting edges of said blades remain parallel and move closer together when said blades are moved together so that the cutting edges of the blades upon first engaging the randomly oriented twisted pair of wires reorient the twisted wire pair until the line drawn between the centers of the wires in the plane of the cutting edges is substantially parallel to the cutting edges;

continuing moving the pair of cooperating blades together in said direction of linear reciprocation so that said cutting edges sever at least a portion of the insulation sheath on each wire in the plane defined by said cutting edges;

preventing said cutting edges from moving closer together than the diameters of said wire cores;

withdrawing the twisted wire pair from between the blades in a direction transverse to the plane defined by said cutting edges to strip the insulation from the wire ends; and moving said cooperating blades apart in said direction of linear reciprocation.

6. The process of claim 5 wherein stripping of the insulation sheaths is accomplished by withdrawing said length from between said blades in the direction of said length extends from said blades.

* * * * *